C. ELMORE.
STEAM COOKER.

No. 176,524.  Patented April 25, 1876.

Witnesses:
B. S. De Forest
F. Tibbitts

Inventor:
Charles Elmore
by Geo. W. Tibbitts, Atty.

UNITED STATES PATENT OFFICE

CHARLES ELMORE, OF BEREA, OHIO.

IMPROVEMENT IN STEAM-COOKERS.

Specification forming part of Letters Patent No. 176,524, dated April 25, 1876; application filed January 19, 1876.

*To all whom it may concern:*

Be it known that I, CHARLES ELMORE, of Berea, in the county of Cuyahoga and State of Ohio, have invented a new Steam-Cooker, of which the following is a specification:

This invention relates to a steam-cooker having several compartments for cooking meats, vegetables, &c., by steam; and consists of a tray having a large opening in the middle, surrounded by a flange, said tray being used for catching and retaining the juices from the cooking meats, which may be preserved and made into soup or broth. The said tray may be placed underneath any one of the steamers.

The invention further consists in the combination of a heavy-beaded flange on the upper edges of said tray, the several steamer-compartments, and the boiler itself, for the prevention of outside dripping of condensed steam, and for giving additional strength to the said vessels.

Figure 1:
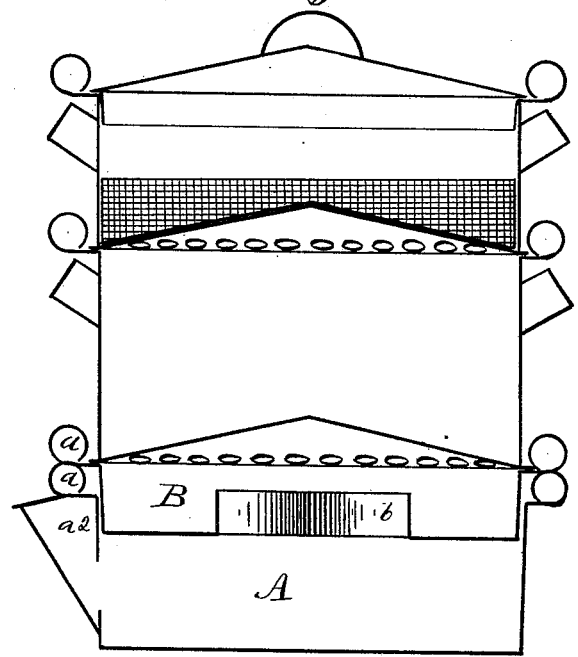
Figure 2:
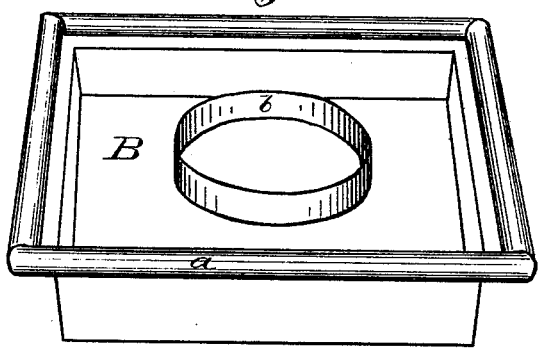

Figure 1 is a vertical section of my before-mentioned steam-cooker, showing the relation of the tray to the boiler and steamer. Fig. 2 is a detached perspective view of the said tray.

A is a boiler, open at the top, and, for convenience in manufacture, is made square, though it and the accompanying tray and steamers may be made round. The said boiler, as well as the tray and steamers, has a heavy-beaded flange, $a$, attached to its upper edges, leaving a narrow ledge for the next upper vessel or cover to rest upon. The boiler also has a spout, $a^2$, for convenience of filling or emptying. B is the tray, having a large opening in the middle of its bottom, and which is surrounded with a flange, $b$. The opening allows the steam to pass upward into the upper compartments, while the space around said opening forms a receptacle for catching the juices from cooking meats from the compartment immediately above it. The bottoms of the several steamers are made crowning or highest in the middle, and are perforated at the edges, so that the steam has free access to the upper compartments, and the condensed steam drips back at the edges also. The beaded flanges $a$ catch any outside dripping.

With the use of the tray, which catches the juices, the water in the boiler is kept clean from drippings, and is fit and useful for making tea, coffee, &c.

With the above description it will be seen that this makes a very cheap and simple cooker for all the purposes for which it is adapted.

In one of the steam-compartments is placed a pan made of wire-gauze or perforated tin, for steaming rice, beans, corn, or other small grains, that would otherwise fall through the large holes in the bottom of the steamers; also, aids in removing the same.

I claim—

1. In a drippings-catching device for cooking utensils, the drip-pan B, constructed with a central flanged opening, rising from the bottom, and having a surrounding receptacle and an external beaded flange, $a$, substantially as shown and described.

2. The beaded flange $a$, in combination with the boiler, tray, and steamers, as shown and described, and for the purpose set forth.

CHARLES ELMORE.

Witnesses:
GEO. W. TIBBITTS,
F. W. CADWELL.